Fig. 3

Feb. 22, 1966        R. E. DAVISON ETAL        3,236,073
                COIN OPERATED DRY CLEANING SYSTEM
Filed Dec. 23, 1963                              6 Sheets-Sheet 5

Fig. 5

| ITEM ENERGIZED | | COIN START | CLEAN | DRAIN | SOLVENT RECOVERY | | AERATE | STOP |
|---|---|---|---|---|---|---|---|---|
| | | | | | TIMED | VARIABLE | | |
| COIN SWITCH | 66 | | | | | | | |
| MOTOR BRUSH | 68a | | | | | | | |
| CAM SWITCH | 72 | | | | | | | |
| FLOW SWITCH | 61 | | | | | | | |
| AIR VALVE OPEN | 29 | | | | | | | |
| AIR VALVE OPEN | 41 | | | | | | | |
| WATER VALVE OPEN | 44 | | | | | | | |
| BLOWER | 27 | | | | | | | |
| CAGE MOTOR | 12 | | | | | | | |
| HIGH SPEED | 13 | | | | | | | |
| FLOW VALVE | 17 | | | | | | | |
| HEATER | 38 | | | | | | | |
| MOTOR BRUSH | 79 | | | | | | | |
| TIMER MOTOR | 86 | | | | | | | |

OPERATION

INVENTORS
RICHARD E. DAVISON
MERRILL E. DAVISON
& LAIN DAVISON

BY
*Irons, Birch, Swindler & McKie*
ATTORNEYS

Feb. 22, 1966  R. E. DAVISON ETAL  3,236,073
COIN OPERATED DRY CLEANING SYSTEM
Filed Dec. 23, 1963  6 Sheets-Sheet 6

Fig. 6

| ITEM ENERGIZED | COIN START | CLEAN | DRAIN | SOLVENT RECOVERY TIMED | SOLVENT RECOVERY VARIABLE | AERATE | STOP |
|---|---|---|---|---|---|---|---|
| COIN SWITCH 66 | ▌ | | | | | | |
| MOTOR BRUSH 68a | ▌ | | | | | ▌ | ▌ |
| CONTACT 136 | ▌ | | | ▌ | | | |
| FLOW SWITCH 61 | | | | | ▌ | | |
| AIR VALVE OPEN 29 | | | | | ▌ | ▌ | |
| AIR VALVE OPEN 41 | | | | | | ▌ | |
| WATER VALVE OPEN 44 | | | | | ▌ | | |
| BLOWER 27 | | | | | ▌ | ▌ | |
| CAGE MOTOR 12 | | ▌ | ▌ | ▌ | | | |
| HIGH SPEED 13 | | | ▌ | | | | |
| PUMP MOTOR 104 | | ▌ | | ▌ | | | |
| HEATER 38 | | | | | ▌ | | |
| MOTOR BRUSH 79 | | | | | ▌ | ▌ | ▌ |
| TIMER MOTOR 86 | | ▌ | ▌ | ▌ | ▌ | ▌ | ▌ |
| DOOR SOLENOID 132 | ▌ | | | | | | |
| TEST CONTACTS 164 & 165 | | | | ▌ | | | ▌ |

INVENTORS
RICHARD E. DAVISON
MERRILL E. DAVISON
& LAIN DAVISON
BY
Irons, Birch, Swindler & McKie
ATTORNEYS 3,236,073
COIN OPERATED DRY CLEANING SYSTEM
Richard E. Davison, Galesburg, Ill., and Merrill E. Davison and Lain Davison, Clarinda, Iowa, assignors to Hupp Corporation, Cleveland, Ohio, a corporation of Virginia
Filed Dec. 23, 1963, Ser. No. 332,719
12 Claims. (Cl. 68—12)

This application is a continuation-in-part of our prior copending application Serial No. 186,440, filed April 10, 1962, and now abandoned on "Dry Cleaning System With Means Responsive to the Condensed Solvent To Control Timer Application."

This invention relates to an automatic coin operated dry cleaning system characterized by its use of a flow responsive device in its solvent recovery system to disable its sequencing timer until the solvent recovery is complete.

In the prior art of dry cleaning with volatile solvents it is well known to use two-speed extracting tumblers, circulating blowers, solvent condensers, solvent heaters, water-solvent separators, lint filters, solvent reservoirs, and vapor and liquid valves to provide the means for cyclically processing fabrics and clothing through various washing and cleaning operations.

Further, with the advent of coin operated machines, it has become common to provide such cleaning systems, with a coin initiated sequencing timer which will energize and control the foregoing dry-cleaning system elements in a predetermined fixed timing sequence.

However, in that portion of any such dry cleaning cycle which is devoted to the extraction and recovery of the residual volatile solvent from the work load, the required time is highly variable dependent on the weight of the work load, its absorbency and exposed area, the temperature of the work chamber and several other variables. Evidently, under-drying results in the loss of valuable cleaning fluid. Over-drying, on the other hand, causes static electricity, excess linting of garments and, in addition, may cause shrinkage and heat damage to the work. For this reason, a fixed timing sequence for this solvent recovery phase of a dry-cleaning process is subject either to excess loss of solvent or to damage to the work load.

The present invention overcomes this deficiency in conventional fixed time cycle machine by providing a solvent flow-responsive device of unique and simple design to intervene between the solvent condenser and solvent reservoir tank and to be able to disable said timer by stopping its advance during this phase of the cleaning operation, until the diminution of this flow signals that the drying recovery process has been sufficiently completed to resume the fixed sequence timing operation. Besides overcoming the foregoing work hazards, this variable time recovery control system assures that the minimum time is consumed per coin load, thereby increasing the possible income from the machine.

It is an object of the present invention to provide a control system for automatic and coin operated dry cleaning machines which prevents over or under drying of the work load during the solvent recovery phase of dry cleaning.

It is another object of the present invention to provide an inexpensive and reliable control system for coin operated dry cleaning machines which will minimize the time required per coin load while assuring a maximum recovery of solvent for reuse.

It is still another object of this invention to provide a simple and positive means for disabling the timer of an automatic dry cleaning machine for a variable time whose termination is determined by the proper degree of drying of the work load during the solvent recovery phase of the dry cleaning cycle.

It is a further object of the invention to provide a coin operated dry cleaning machine which maximizes the solvent recovery for reuse while preventing excess linting, shrinkage or heat damage to its work load.

It is a further object of the invention to provide a safety lock on the door of the cleaning and extraction chamber to prevent the door from being opened until the cycle of operations is complete and all solvent has been removed from the chamber.

It is a further object of the invention to provide means for checking the solvent recovery operation to guard against undetected operational failure of the apparatus by such causes as lack of circulation of cooling water, failure of the blower to operate, etc.

For other objects and a better understanding of the subject invention, reference may be had to the following detailed description taken in connection with the accompanying drawing, in which.

Figure 2:
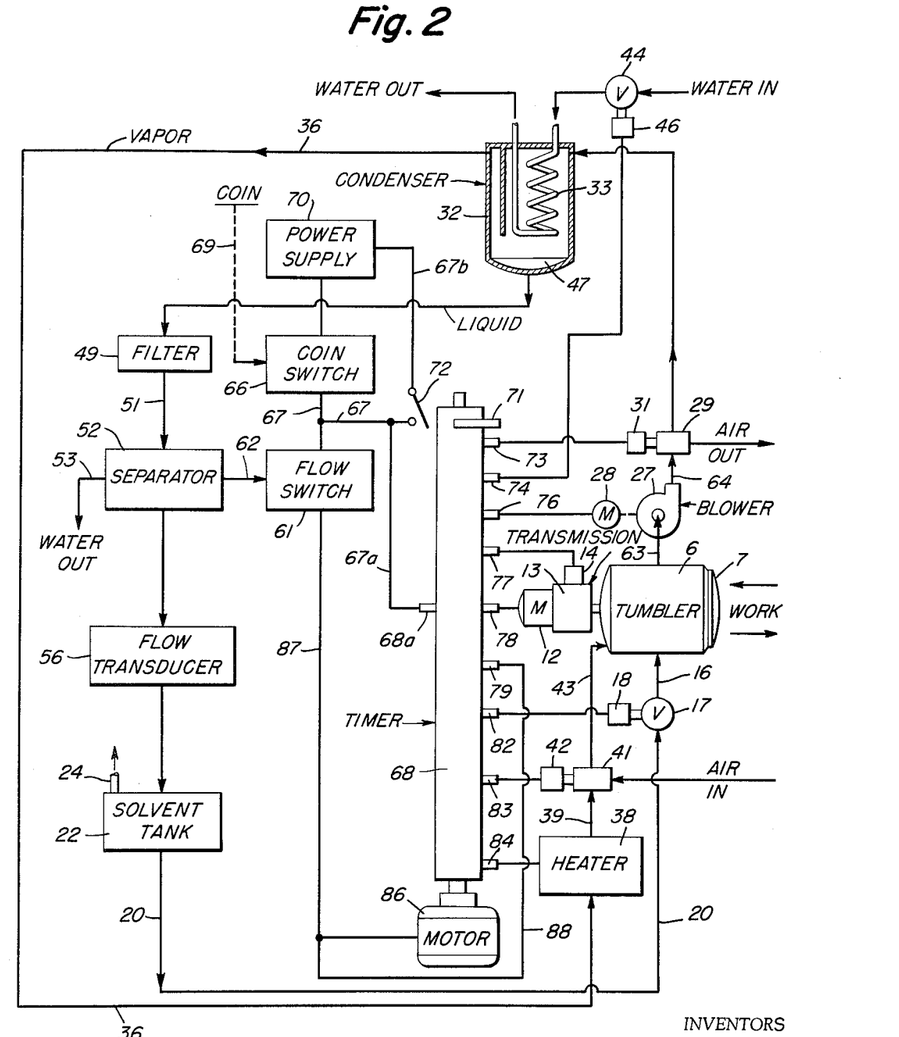
FIG. 2 is a schematic block diagram of an automatic coin operated dry cleaning system embodying the liquid and vapor circuits of FIG. 1.
Figure 4:
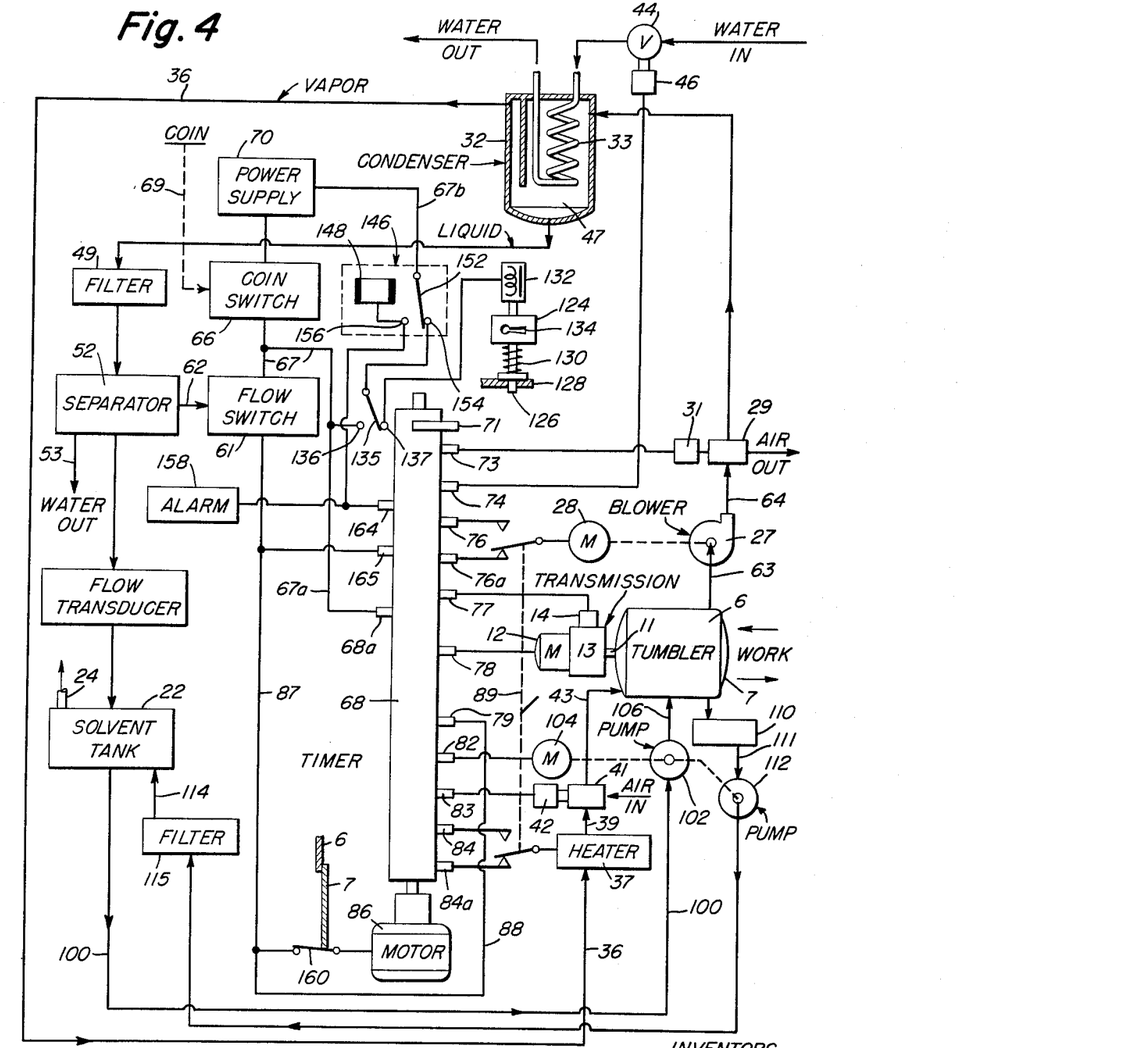
FIG. 4 is a schematic block diagram of the system shown in FIG. 3.

To simplify and clarify the diagrams shown in FIGS. 2 and 4, only one side of each electrical branch circuit is shown with it being understood that each electrical circuit is completed by a conductor (not shown) which is connected as a return line or common ground to power supply 70. For example, return lines to power supply 70 come from motors 12, 28, 86 and 104; heater 38; solenoids 14, 18, 31, 42, 46 and 132; alarm 158; and relay coil 148.

Figure 1:
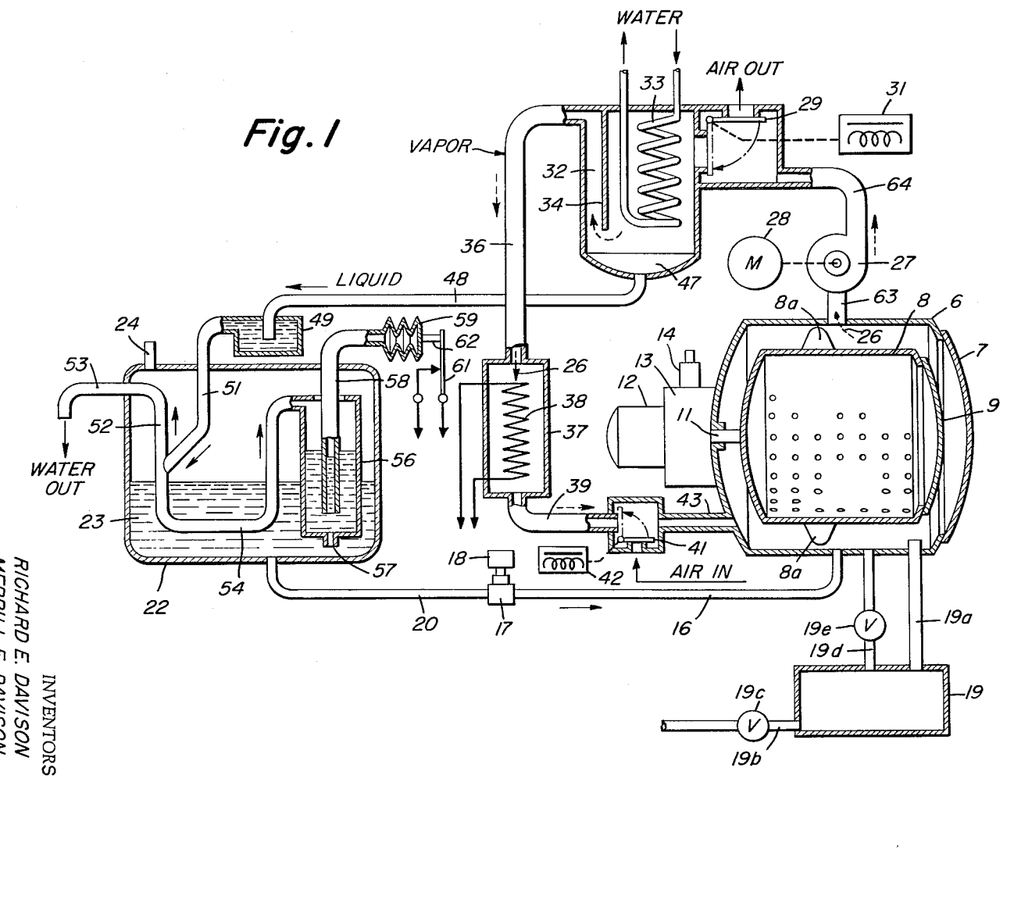
FIG. 1 is a schematic diagram of the liquid and vapor circuits of an automatic dry cleaning system embodying the present invention.

Referring now to FIGS. 1 and 2 of the drawings, 6 is a dry cleaning chamber provided with a door 7 and a perforated tumbling and spinning rotor cage 8 having, in turn, its own access door 9.

Rotor cage 8 is supported on a shaft 11 driven by a motor 12 through a two speed gear shift mechanism 13. A control solenoid 14 is provided to change the effective gear ratio of transmission 13 between low speed tumbling and high speed centrifugal spin-dry operation.

Fluid intake duct 16, having solvent valve 17 controlled by solenoid 18, gives controlled access between solvent reservoir tank 22 and cleaning chamber 6 via duct 20, so that opening of valve 17 by the energization of solenoid 18 allows solvent 23 in tank 22 to flow by gravity from tank 22 (which is vented by duct 24) into the bottom of chamber 6 where it is vaporized by heat to clean clothes in rotor cage 8.

If the solvent entering chamber 6 is not vaporized as fast as it enters, it will accumulate on the bottom until it overflows through pipe 19a into tank 19. Solvent accumulated in tank 19 may be periodically drained therefrom through conduit 19b connected near the bottom of tank 19 and normally closed by hand valve 19c, which is opened when tank 19 is to be drained. Another conduit 19d, normally closed by hand valve 19e, connects the bottom of chamber 6 with the top of tank 19. Valve 19e can be opened to drain all of the solvent from chamber 6. Solvent drained from tank 19 can be filtered and returned to reservoir tank 22.

Agitator paddles (one of which is shown at 8a), extending outwardly on the outside of cage 8, may be provided to agitate unvaporized solvent, help vaporize it, and distribute it around cage 8 and onto clothes being cleaned within the cage.

Solvent vapors 26 (as shown by dotted arrows, FIG. 1) from chamber 6 may be drawn off by a blower 27 driven by motor 28, and forced, via a two position venting valve 29 controlled by solenoid 31, through a condensation chamber 32 which contains the water cooled condenser coil 33. Vapors entering chamber 32, after passing around a baffle plate 34, pass in sequence through a duct 36, a heater chamber 37 having an electric heater coil 38 therein, a duct 39, a two position venting valve 41 controlled by solenoid 42, and thence, via a duct 43, back into the cleaning chamber 6.

With the blower 27 operating, valves 29 and 41 in the non-venting positions shown in FIG. 1, and heater 38 energized, the heated solvent cleaning vapors 26 may be circulated over the tumbling work load during the cleaning phase of the cycle.

When it is desired to recover solvent from the vapor state, cooling water is passed through condenser coil 33 by the opening of valve 44 through the agency of solenoid 46, FIG. 2. The liquid condensate solvent forming on coil 33 drips down into sump 47 of chamber 32 and passes via duct 48 through lint filter 49, and thence via duct 51 into separator column 52. Here the differential densities of the solvent, such as perchloroethylene, and water cause the lighter water to separate from the mixture and rise to the top where it is discarded via drain 53. The heavier solvent descends and flows through pipe 54 into a flow-transducing outer tube 56 having an outlet vent 57 which forms a restrictive orifice venting into the solvent storage tank 22. A pressure tube 58 is concentrically entrant into tube 56 from the top and has an open lower end near the exit orifice 57 within tube 56. The upper end of pressure tube 58 communicates with a pneumatic pressure responsive bellows 59, whose responsive motions are coupled to a normally closed switch 61 by means of insulating linkage 62.

Thus when a sufficient volume of condensate solvent is being delivered per unit time to sump 47 by condenser 33, there will exist a hydraulic pressure head within tube 56 due largely to the constriction of outlet orifice 57. This hydraulic pressure will compress the air and vapor entrapped within the concentric pipe 58 thereby extending bellows 59 and maintaining switch 61 in an open condition as long as a predetermined rate of condensate flow is maintained.

However, when the condensation on coil 33 diminishes beyond this predetermined rate or ceases altogether, the liquid traveling from sump 47 downwardly through ducts 48 and 51 will cause inadequate pneumatic pressure in tube 58 to hold the normally closed spring-loaded switch 61 open, and the decrease of solvent flow will therefore close switch 61, thereby signalling that the work load is properly dry.

When it is desired to circulate air through the work load for the final deodorization and cooling of the garments or fabrics in tumbler 8, motor 12 and gear shift 13 are adjusted for slow tumbling and, with blower 27 energized, solenoids 31 and 42 are de-energized thereby allowing the spring loaded flapper valves 29 and 41 to seal off chambers 32 and 37, while venting chamber 6 to the open air through blower 27 and duct 43 respectively. Ducts 63 and 64 connect blower 27 with tub 6 and valve 29 respectively.

It is to be understood that the system indicated in FIG. 2 is not intended to be complete or exclusive of many other feasible configurations, but instead is intended to be illustrative of one operable dry cleaning system which embodies a solvent recovery phase within which the subject invention contributes its valuable variable time teaching.

In FIG. 2 it may be seen that conventional coin operated switch 66 is provided to supply electrical power from power supply 70 through coin switch 66, lines 67 and 67a, drum brush 68a, drum 68, and drum brush 79 via line 88 to motor 86 for enough time to displace by motor 86 cyclic timer drum 68 from its home position in response to the insertion of a coin into coin channel 69. After drum 68 is displaced from its home position, cam 71 secured to drum 69 closes switch 72 to thereby electrically by-pass coin switch 66 and directly supply power from power supply 70 via lead 67b, closed switch 72, lead 67a, drum brush 68a, and timer drum 68 for energizing motor 86 through brush 79 and for distribution in a predetermined sequence to output brushes 73, 74, 76, 77, 78, 79, 82, 83 and 84 until drum 68 completes a dry cleaning cycle at which time cam 71 opens switch 72 and de-energizes the system until after the insertion of another coin.

Timing drum 68 is driven by geared drive motor 86, which motor may receive power from power supply 70 either: (1) through lead 87 via lead 67b, closed contact 72, lead 67, and normally closed flow switch 61; or (2) via lead 88 from brush 79 which is energized at all times after coin switch 66 is operated, except during the solvent recovery phase of operation. Then, brush 79 is electrically disconnected at timer drum 68 from lead 67b and motor 86 can then receive energization only through lead 87 via flow switch 61.

In this way, within the selected recovery phase of operation, the fixed timing cycle dictated by timing motor 86 may be interrupted by brush 79, and the machine control may be given over to the flow switch 61 which is responsive to the variable time necessary to complete the proper degree of solvent extraction. The timer drum is of course of any well-known construction operative to connect brush 68a to output brushes 73 to 84 in a predetermined pattern of sequences to energize the corresponding control elements through a dry cleaning cycle.

The operation of the subject invention is as follows: On deposit of a coin in channel 69, FIG. 2, the timer drum 68 initiates a cleaning cycle involving the transfer of solvent from tank 22 into the work load within chamber 6. When timer 68 has advanced through the cycle to the point at which the machine is recovering the solvent from the work load in chamber 6 by condensing it in chamber 32 and returning it in liquid form from sump 47 to storage tank 22, the electrical path through drum 68 from line 67a to brush 79 is broken at brush 79 and the timing motor 86 is stopped because switch 61 will be open at this time. The rotation of timing drum 68 will then continue to be suspended for a variable time until a sufficient degree of extraction and drying of the work load within chamber 6 has been achieved to allow the level in tube 56 to fall, thereby reclosing flow switch 61 and re-energizing motor 86 to complete its cleaning cycle.

Figure 5:
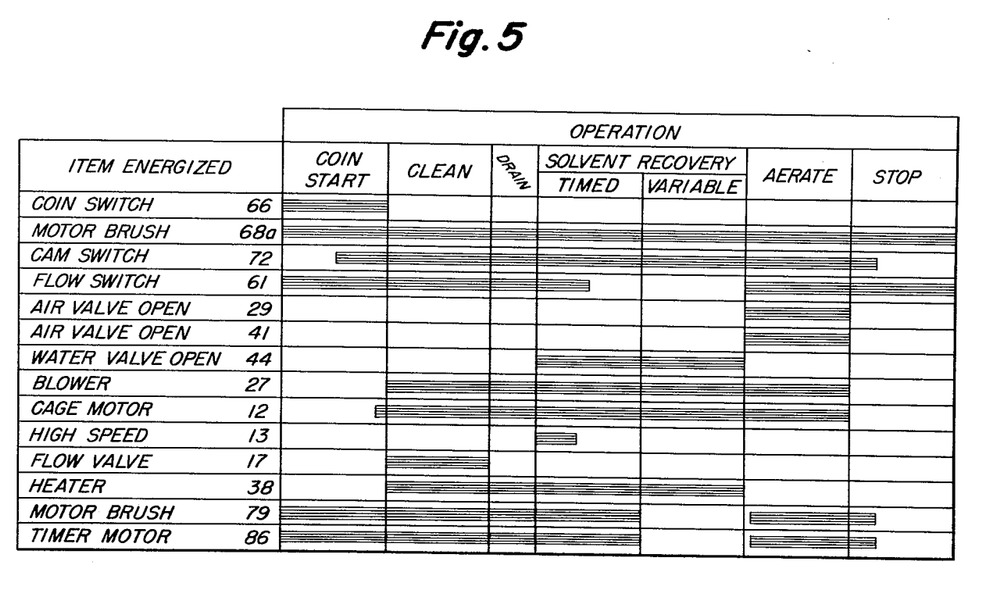
FIG. 5 is a timing diagram showing the sequence of operations in the system shown in FIG. 1.

FIG. 5 shows the timing sequence of timer 68 during one revolution as it controls a complete cycle of operations during the:

(a) Coin start period,
(b) Cleaning period,
(c) Timed solvent recovery period,
(d) Additional variable solvent recovery period,
(e) Deodorization and aeration period, and
(f) Shutdown or stop period.

These periods are of different lengths depending on the operation. Coin switch 66 momentarily energizes motor 86 through brushes 68a and 79 to start the cycle. Cam switch 72 is closed before coin switch 66 is opened and remains closed throughout the cycle. Flow switch 61 is closed except during the solvent recovery period when it opens as soon as solvent recovery reaches a normal rate and remains open until solvent recovery is complete. Air valves 29 and 41 are open during the aeration period only. Water valve 44 is open only during the entire solvent recovery period. Blower 27 operates during cleaning, solvent recovery and aeration period. Cage motor 12 starts tumbling operation just prior to the start of the cleaning operation and continues to operate until the end of the aeration period. Gears 13 cause it to rotate at high speed for centrifugal spin dry operation during the first part of the solvent recovery period and at low speed during cleaning, aerating, solvent draining, and the balance of the solvent recovery period. A 30-second solvent drain period is preferably provided after cleaning and before solvent recovery with solvent flow valve 17 closed, cage motor 12 operating driving cage 8 at low speed, and water valve 44 closed. Then, some of the solvent is drained from the clothes in cage 8. Heater 38 and blower 27 are preferably energized throughout the cleaning and solvent recovery operations for reasons given in more detail hereafter during explanation of FIGS. 3, 4 and 6. Timer motor 86 is sequentially energized through: (1) coin switch 66, drum brushes 68a and 79 with the contact 72 open at cam 71, (2) closed cam switch 72 and drum brushes 68a and 79, (3) cam switch 72 and flow switch 61 with the contacts open at brush 79, and (4) closed cam switch 72 and drum brushes 68a and 79 to complete the machine cycle. When contact 72 opens, the circuits energizing motor 86 through brushes 68a and 79 and flow switch 61 are broken, and the machine cycle ends.

The times motor 86 operates throughout the cycle except when it is stopped during the variable recovery period after flow switch 61 is opened and brush 79 is de-energized. When flow switch 61 again closes when solvent recovery is complete, motor 86 is re-energized. Cam 71 keeps cam switch 72 closed until after the close of the aeration period.

Figure 3:
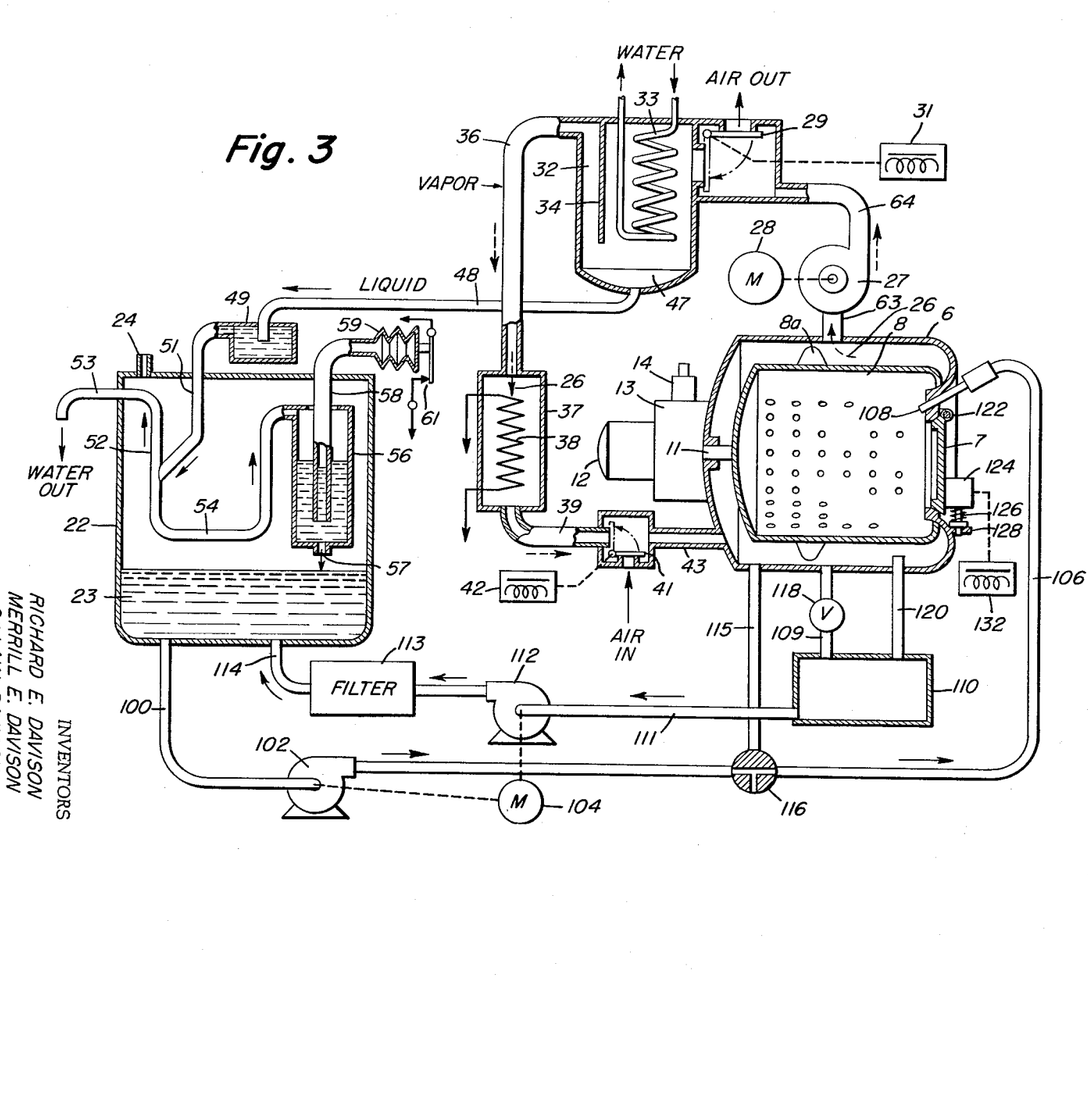
FIG. 3 is a schematic diagram of the liquid and vapor circuits of a system incorporated into a modified form of the invention.
Figure 6:
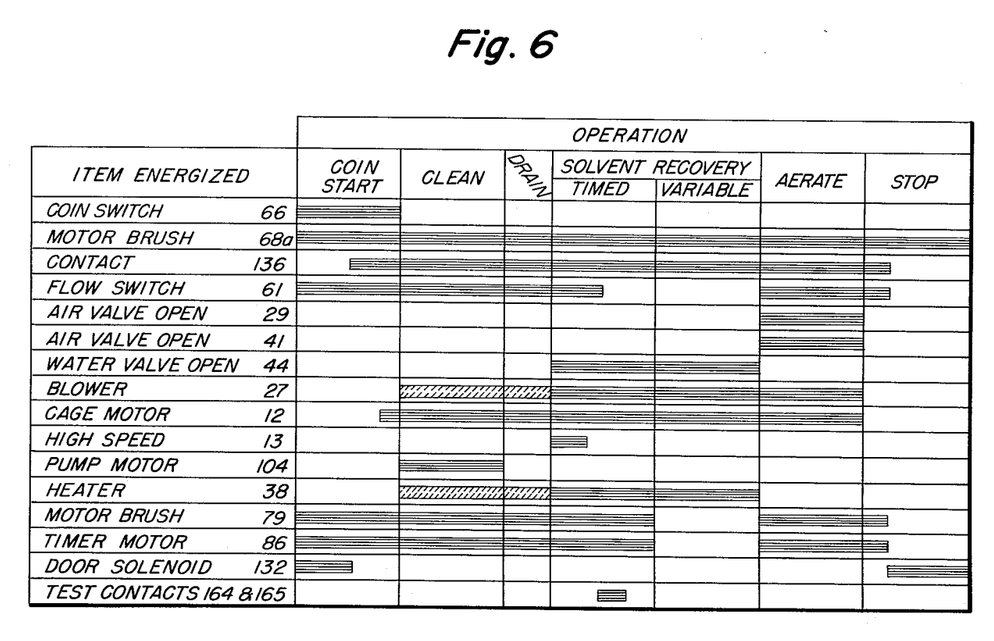
FIG. 6 is a similar timing diagram showing the sequence of operations in the system shown in FIG. 3.

FIGS. 3 and 4 show a modified form of the invention, with timing cycle thereon represented by FIG 6. Parts which are the same as those incorporated in the first form shown in FIGS. 1 and 2 are identified by the same reference characters. The modification shown in FIGS. 3 and 4 includes these features not found in FIGS 1 and 2:

(a) Pumps 102 and 112 and motor 104 circulate solvent instead of gravity flow controlled by solenoid 18 and valve 17;

(b) Spray from nozzle 108 applies the solvent to the clothes in revolving cage 8;

(c) Means returns dirty solvent by pump 112 from cleaning chamber 6 to storage tank 22 and filter 113 removes dirt from the solvent;

(a) Door lock 124 is kept locked during the operating cycle and is unlocked by solenoid 132 at the end of the cycle;

(e) Means checks the solvent recovery rate, shuts down the machine, and actuates alarm 158, such as a red light or bell, if solvent is not being recovered at a normal rate during the solvent recovery period;

(f) Switch 135 is used instead of switch 72; and (g) Relay 146, alarm 158, drum brushes 164 and 165, door switch 160, switch 89, brushes 76a and 84a, and door latch assembly 124, 126, 128, 130, 132 and 134 have been added.

Several methods of solvent circulation are available.

Solvent is withdrawn from tank 22 through conduit 100 by pump 102 driven by motor 104, and is forced through conduit 106 and nozzle 108 into chamber 6 to spray the solvent on the clothes being cleaned. Solvent not evaporated or retained in the clothes will drain to the bottom of chamber 6 and flow through conduit 109 into tank 110, from which it will be drawn through conduit 111 by pump 112, also driven by motor 104, and forced through filter 113 and conduit 114 into tank 22. Thus, the clothes will be cleaned by the washing action of the solvent pouring over them, and the solvent will be withdrawn by pump 112, cleaned by filter 113 and returned to storage tank 22 ready for reuse; blower 27 and heater 38 will not be on during the cleaning cycle as indicated by the corresponding solid line bars in FIG. 6 (the significance of the dotted line bars is explained hereinafter); and manually actuated double pole, double throw selector switch 89 in FIG. 4 will be positioned to close the contacts connecting brushes 76a and 84a respectively to blower motor 28 and heater 38 to energize them at the appropriate times.

Since it maybe desirable under some cleaning conditions to introduce the solvent into the bottom of tank 6, another inlet conduit 115 is provided. Conduit 115 is connected to the outlet from pump 102 by turning a 3-way, hand-operated valve 116 in line 106. When the plug in valve 116 is in one position, the flow will be straight through valve 116 to nozzle 108; while if the valve plug is turned 90 degrees, the flow will be through conduit 115 into the lower part of tank 6.

In case the machine operator wants to maintain a pool of solvent in tank 6, there is provided hand valve 118 in conduit 109 and overflow pipe 120 connecting the interior of tank 110 with the interior of chamber 6 at a point above its bottom. When valve 118 is open, solvent will drain through conduit 109 to completely drain chamber 6; while when valve 118 is closed, solvent will overflow through pipe 120 so as to provide a pool of solvent in the bottom of tank 6.

When solvent is introduced into tank 6 through conduit 115, the clothes may be cleaned by solvent splash from paddles 8a, by solvent vapor coming from the solvent pool in the bottom of tank 6 maintained by pipe 120, or by circulated solvent vapor. Then, blower 27 and heater 38 will preferably also be on during the cleaning cycle to promote the circulation of solvent vapor through the clothes as indicated by the corresponding combined solid and dotted line bars in FIG. 6; and manually actuated selector switch 89 in FIG. 4 will be positioned to close the contacts connecting brushes 76 and 84 respectively to blower motor 28 and heater 38 to energize them at the appropriate times.

FIGS. 3 and 4 have safety features. These safety features operate on the assumption that at the conclusion of the dry cleaning cycle, the load should be dry and free of solvent, and that a reliable indication that the operation is progressing properly to this end may be ascertained from the rate of flow of condensate during the drying operation, which if normal, is sufficient to open pressure switch 61 in FIG. 4. If the rate of condensate flow is insufficient to operate and open the pressure switch, it serves as an indication that, at the close of the entire cycle, the load would be found saturated with perchloroethylene. Under such circumstances, dry cleaner door 7 should remain locked against opening, except by the attendant. Such failure could be the result of failure to function properly of blower 27, heater 38, water in condenser 33, etc. If failure occurs, an alarm 158 is sounded and door 7 can be opened only by authorized personnel.

Loading and unloading door 7 on chamber 6 is normally held closed by lock 124 during machine operation until the cycle is complete and all solvent has been removed from chamber 6. Lock 124 is unlocked only either by energization of solenoid 132 at the end of the cycle, or in an emergency, by operation in key hole 134 (FIG. 4) of a key retained by an attendant. Door 7 is hinged at 122 on its upper edge to chamber 6. On its lower end is lock 124 having bolt 126 biased by spring 130 into engagement with hasp 128 attached to the bottom of chamber 6. See FIGS. 3 and 4. Solenoid 132 retracts bolt 126 when energized. Keyhole 134 permits insertion of a key (not shown), which when turned can also retract the bolt so that an attendant can open the door prior to completion of a cycle, if necessary.

Hence, door solenoid 132 is energized to retract latch 126 and to permit opening door 7 when contact 137 (FIG. 4) automatically closes at the end of the cycle. Solenoid 132 is energized by a circuit from power source 70 through line 67b and closed contacts 154 and 137. Solenoid 132 remains energized while the machine is stopped and until cam 71 again actuates switch 135 to open contact 137 and to close contact 136 during the next machine cycle. If the electricity fails, de-energized solenoid 132 will keep door 7 locked.

Switch 72 in FIG. 2 is replaced by double throw switch 135 in FIG. 4 having normally open contact 136 and normally closed contact 137. Contact 136 is closed and contact 137 opened by cam 71 when timer drum 68 is first rotated. Contact 136 in FIG. 4 connects line 67b through normally-closed contact 154 to lines 67 and 67a in generally the same manner as contact 72 connected these lines in FIG. 2. Contact 137 is connected in series with solenoid 132 so that when drum 68 is at rest at the end of a cycle, closed contact 137 will energize solenoid 132 to retract bolt 126 and to open lock 124. However, during the operating cycle, contact 136 will be closed to by-pass coin switch 66 in generally the same manner as when switch 72 in FIG. 2 is closed, and then contact 137 will be opened to de-energize solenoid 132 to keep door 7 locked.

Switch 160 (FIG. 4) is in the energizing line to timer motor 86, is closed when door 7 is closed, and assures that timer drum 68 cannot be moved from start position until door 7 is properly closed.

Means are provided for checking the solvent recovery operation to guard against failure of the apparatus by such causes as lack of circulation of cooling water through condenser 33 or failure of blower 27 to operate. The electrical controls and timer circuits are so arranged that flow switch 61 must be opened or tripped within a predetermined time after drying and solvent recovery starts to indicate proper operation of the solvent recovery and drying systems. If the flow switch is not opened or tripped within this time period, an electrical pulse energizes fail-safe relay 146 and the machine is shut down.

Numerous structural changes are involved in FIGS. 3 and 4 to make possible these functions. Relay 146 is provided with relay coil 148 actuating relay blade 152 having an upper pivot end in FIG. 4 connected to power supply line 67b and a lower end movable between normally closed contact 154 connected to switch 135 and normally open contact 156 connected in branch circuits to coil 148 and to alarm 158. Coil 148 is energized and connected to power supply 70 via line 67b, blade 152, normally closed contact 154, closed contact 136, line 67, normally closed flow switch 61 and test contacts 165 and 164 making momentary contact during the timed portion of the solvent recovery period, and through alarm 158 and relay coil 148 back to power supply 70.

Brush test contacts 164 and 165, carried by timer drum 68, are closed momentarily during the latter part of the timed solvent recovery period. If the solvent is then being recovered in tube 56 at a normal rate, flow switch 61 will be open so that the circuit through coil 148 will be broken at open contact 61 and the cycle of operation will proceed in a normal manner. The upper end of tube 56 in FIG. 3 is open so that the condensate can freely overflow into tank 22 if its flow rate exceeds the flow rate of orifice 57.

If there is not sufficient solvent recovery taking place to cause bellows 59 to keep switch 61 open during the test period, relay coil 148 is energized and alarm 158 is actuated. When brushes 164 and 165 make contact, the aforementioned circuit is formed to energize coil 148. Energizing relay coil 148 attracts blade 152, opens contact 154 and closes contact 156. Opening of contact 154 cuts off all power to the machine through timer drum 68 and to solenoid 132 respectively to stop the machine and to securely lock door 7. Closing contact 156 energizes coil 148 and alarm 158 by a coil holding circuit from power supply 70 through line 67b, contact bar 152 and closed contact 156 to hold coil 148 energized, to maintain contact 154 open and contact 156 closed, and to energize alarm 158 to cause it to give an audible or visual signal which continues until authorized personnel cuts off power at power supply 70. Then, timer drum 68 can be turned to another position to avoid re-energizing relay coil 148 when power is restored.

Especially important in this modification are the features of: (1) door lock 124, and (2) means for shutting down the machine with door 7 locked if there is insufficient solvent recovery. These features eliminate any health hazard to users of the machine by inhaling solvent fumes either from escape of solvent from the open door or from solvent still on clothes after removal from the machine if the solvent was not completely removed because of an operating failure of some component essential to complete solvent recovery. The machine door 7 is locked during the complete cycle, the operator has no contact with the perchloroethylene, and the clothes are always dry when removed from the machine in the normal way without using a key in key hole 134.

While various changes may be made in the detailed construction of the subject invention, it shall be understood that such changes shall be within the spirit and scope of the present invention as defined by the following claims.

We claim:
1. A dry cleaning system which comprises
a chamber for containing articles to be cleaned,
a storage tank for dry cleaning solvent,
conduit means connecting said chamber and tank to transmit solvent in both directions therebetween,
means for condensing solvent vapor in said conduit means as the solvent passes from said chamber to said tank,
operating means including timer for automatically advancing the system through a plurality of operations including a cleaning operation where the solvent is passed through said chamber and the initiation of a drying operation where the solvent is removed from said chamber, and
control means including
    a restricted passage in said conduit means in the path of the solvent being transmitted from said condensing means to said tank,
    a pressure-responsive actuator located outside of said conduit,
    a pressure tube having an inlet located in said conduit means between said condenser and said restricted passage and connected with said actuator to operate said actuator in response to the hydraulic pressure head at said inlet to deactivate said timer means when the rate of liquid flow from said condensing means exceeds the capacity of said restricted passage and to reactivate said timer means when said rate drops below said capacity.

2. The apparatus of claim 1 including
means resonsive to a position of said actuator corresponding to a rate of liquid flow from said condensing means less than the capacity of said restricted passage during a predetermined portion of the drying operation and operatively connected to said operating means thereupon to stop operation of the system.

3. The apparatus of claim 2 in which said system further includes
a door providing access to said chamber to permit placement of articles in the chamber for cleaning and the removal therefrom after the entire cleaning operation,
a lock for said door to prevent opening of the chamber during the cleaning operation,
means connected to said timer means for unlocking said lock when the entire cleaning operation is completed, and disabling means for preventing operation of said last-named means when the operation of the system is stopped by said means responsive to a position of said actuator.

4. The apparatus of claim 3 including alarm means responsive to operation of said disabling means.

5. The apparatus of claim 4 in which said lock is releasable by operation of a key, so that an operator noting said alarm and provided with such key may open the door.

6. A dry cleaning system as recited in claim 1 wherein said conduit means includes an upright portion with said restricted passage being in the lower part of said upright portion to discharge liquid into said tank and said inlet is located above and fixed relative to said restricted passage.

7. A dry cleaning system as recited in claim 6 further comprising an electric motor for operating said timer means and an electric switch responsive to said actuator for controlling the operation of said electric motor.

8. The apparatus of claim 7 including
means responsive to failure of said switch to open during a predetermined portion of the drying operation and connected to said operating means thereupon to stop operation of the system.

9. The apparatus of claim 1 in which said actuator is gas pressure responsive and includes a gas chamber connected to said pressure tube, said actuator being movable in response to the pressure in said gas chamber.

10. A dry cleaning system as recited in claim 9 wherein said conduit means includes an upright portion with said restricted passage being in the lower part of said upright portion to discharge liquid into said tank and said inlet is located above and fixed relative to said restricted passage.

11. The apparatus of claim 2 including means for removing solvent from said chamber, said operating means including a power circuit for furnishing operating voltage to said timer means, said timer means being operable to furnish operating current to said solvent removing means during the drying operation, said responsive means being operable to interrupt said power circuit to stop operation of said solvent removal means as well as to stop operation of said timer means when said rate drops below said predetermined amount during said predetermined portion of the drying operation.

12. The apparatus of claim 11 in which said responsive means includes a pressure responsive switch which is open when said rate is above said predetermined amount but closed when the rate is below the predetermined amount, contacts of said timer means which are closed only during said predetermined portion of the drying operation, and a fault relay having an energizing circuit including said pressure responsive switch and said contacts, said fault relay having normally closed contacts in said power circuit operable to open the power circuit when the relay is energized.

References Cited by the Examiner
UNITED STATES PATENTS

| | | | |
|---|---|---|---|
| 2,019,896 | 11/1935 | Edlich | 68—18 X |
| 2,166,294 | 7/1939 | Hetzer | 68—18 |
| 3,002,287 | 10/1961 | Smith | 68—12 X |
| 3,043,125 | 7/1962 | Horecky | 68—12 |
| 3,065,619 | 11/1962 | Coss | 68—12 |
| 3,085,415 | 4/1963 | Gosnell | 68—12 |
| 2,113,445 | 12/1963 | Williams et al. | 68—12 |
| 3,116,625 | 1/1964 | Stewart | 68—12 |

WALTER A. SCHEEL, *Primary Examiner.*

WILIAM I. PRICE, *Examiner.*